United States Patent
Ichikawa et al.

(10) Patent No.: US 8,033,899 B2
(45) Date of Patent: Oct. 11, 2011

(54) CABIN FOR A WORK VEHICLE

(75) Inventors: Nobushige Ichikawa, Izumi (JP); Shota Nagasawa, Sakai (JP); Daisuke Inaba, Osaka (JP); Hisao Mukai, Sakai (JP); Aya Motoki, Toyonaka (JP); Kenichi Sato, Osaka (KR)

(73) Assignee: Kubota Corporation, Osaka (JP)

( * ) Notice: Subject to any disclaimer, the term of this patent is extended or adjusted under 35 U.S.C. 154(b) by 1046 days.

(21) Appl. No.: 11/371,357

(22) Filed: Mar. 8, 2006

(65) Prior Publication Data

US 2007/0044492 A1 Mar. 1, 2007

(30) Foreign Application Priority Data

Aug. 31, 2005 (JP) ................................. 2005-251643
Aug. 31, 2005 (JP) ................................. 2005-251644
Aug. 31, 2005 (JP) ................................. 2005-251645

(51) Int. Cl.
*B24D 13/00* (2006.01)
*B62D 33/00* (2006.01)
(52) U.S. Cl. ........................................ 454/69; 296/39.3
(58) Field of Classification Search ................ 454/69; 296/39.3
See application file for complete search history.

(56) References Cited

U.S. PATENT DOCUMENTS

| | | | | |
|---|---|---|---|---|
| 3,868,896 A | * | 3/1975 | Doll et al. | 454/137 |
| 5,881,558 A | * | 3/1999 | Kawahara et al. | 62/408 |
| 6,279,978 B1 | * | 8/2001 | Schreyer et al. | 296/39.3 |
| 6,780,097 B2 | | 8/2004 | Shuttleworth et al. | |
| 7,252,585 B2 | * | 8/2007 | Ichikawa et al. | 454/137 |
| 2005/0087332 A1 | | 4/2005 | Umeo et al. | |
| 2005/0092479 A1 | | 5/2005 | Umeo et al. | |

FOREIGN PATENT DOCUMENTS

| | | |
|---|---|---|
| EP | 1 147 971 A2 | 10/2001 |
| EP | 1 627 801 B1 | 10/2007 |
| JP | 60124324 U | 8/1985 |
| JP | 60209319 | 10/1985 |
| JP | 61205505 | 9/1986 |
| JP | 06087317 | 3/1994 |
| JP | 09286227 | 11/1997 |
| JP | 10101298 | 4/1998 |
| JP | 2776475 | 5/1998 |
| JP | 2000-001118 A | 1/2000 |
| JP | 2002-068026 A | 3/2002 |
| JP | 2002067657 | 3/2002 |
| JP | 2003-146052 A | 5/2003 |
| JP | 2005-1537 | 1/2005 |
| JP | 2005112297 | 4/2005 |
| JP | 2005225249 | 8/2005 |
| JP | 2006-035960 A | 2/2006 |

* cited by examiner

*Primary Examiner* — Steve McAllister
*Assistant Examiner* — Helena Kosanovic
(74) *Attorney, Agent, or Firm* — The Webb Law Firm

(57) ABSTRACT

A cabin for a work vehicle comprises: a driver's seat positioned within the cabin; cabin frames including at least a transverse frame located in a rear region of the cabin; a roof supported by at least some of the cabin frames; at least one air-conditioning duct located within the roof; an air conditioning unit located rearwardly with respect to a rearward end of a seat portion of the driver's seat and adjacent the transverse frame for conditioning air and for feeding air-conditioned air into the at least one air-conditioning duct.

2 Claims, 13 Drawing Sheets

CABIN FOR A WORK VEHICLE

BACKGROUND OF THE INVENTION

The present invention is directed to a cabin for a work vehicle, and more particularly to an air conditioning unit within the cabin roof For arranging the air-conditioning unit, the forward half of the roof is formed as a low ceiling portion bulging downward. The air-conditioning unit is arranged in a front portion of the low ceiling portion (e.g. JP Publication No. 2005-1537 (paragraph number [0016], FIG. 1 and FIG. 2).

In the above construction, the roof includes a low ceiling portion that accommodates the air-conditioning unit. This leads to narrowing of an upper forward field of view. Then, when performing a front loader operation, the driver seated on the driver's seat has difficulty in ascertaining a position of the bucket near an upper position, resulting in a possibility of lowering working efficiency.

SUMMARY OF THE INVENTION

The object of this invention is to provide an air-conditioning structure for a cab of a working vehicle with an improved upper forward view by providing a better arrangement for the air-conditioning unit.

A cabin for a work vehicle in accordance with the present invention comprises: a driver's seat positioned within the cabin; cabin frames including at least a transverse frame located in a rear region of the cabin; a roof supported by at least some of the cabin frames; at least one air-conditioning duct located within the roof; an air conditioning unit located rearwardly with respect to a rearward end of a seat portion of the driver's seat and adjacent the transverse frame for conditioning air and for feeding air-conditioned air into the at least one air-conditioning duct.

Since the air-conditioning unit is disposed rearwardly with respect to the rear end of the seat portion of the driver's seat, a low ceiling portion for accommodating the air-conditioning unit need not be formed in a front portion of the roof of the cabin. A windshield position can be set high. As a result, an improved upper forward field of view is provided.

Moreover, since the position of the air-conditioning unit is set rearwardly of the rear end of the seat portion of the driver's seat, a low ceiling portion formed in the rear of the roof in order to accommodate the air-conditioning unit would not diminish the forward field of view of the driver seated on the driver's seat, but can alleviate a narrowing of overhead space.

BRIEF DESCRIPTION OF THE DRAWINGS

FIG. 16 (B) shows a principle view showing an upper forward field of view for the driver in FIG. 16 (A);

DETAILED DESCRIPTION OF PREFERRED EMBODIMENTS

While several embodiments will be described below, a combination of a feature in one embodiment with another in a different embodiment is understood to be within the scope of the present invention unless such combination leads to a contradiction.

Figure 1:
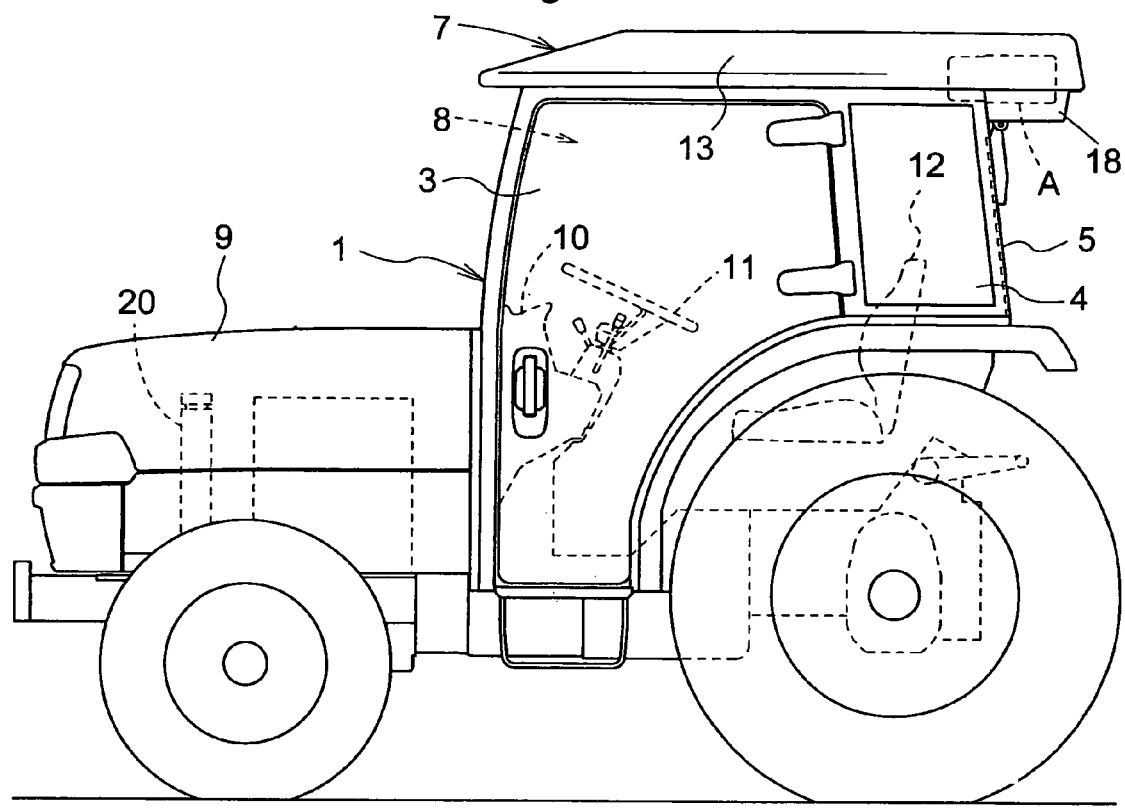
FIG. 1 shows a side elevation of a tractor.
Figure 2:
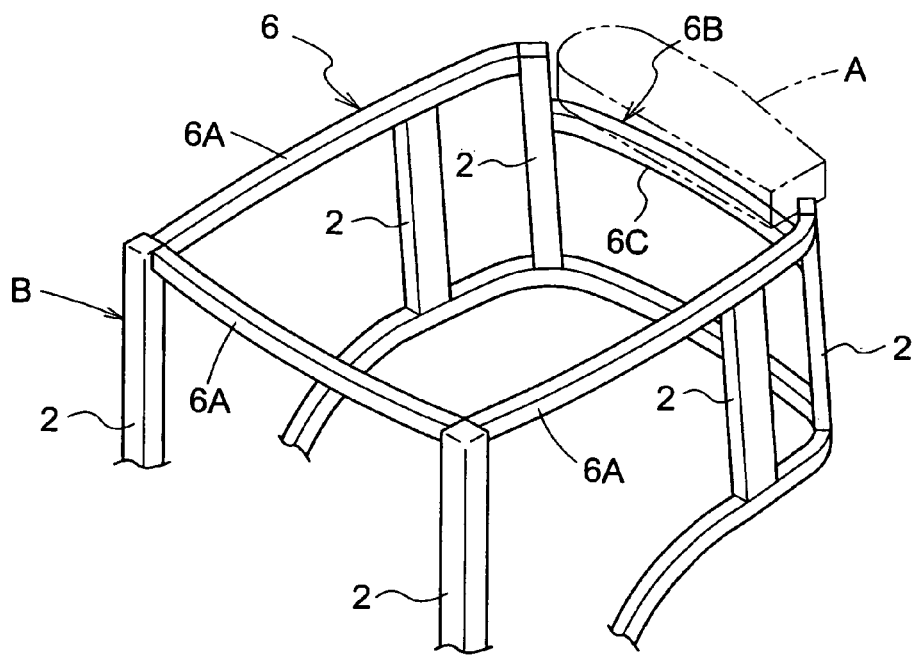
FIG. 2 shows a perspective view showing a structural framework in a first embodiment.

An agricultural tractor will be described as an example of the maintenance vehicle. As shown in FIGS. 1 and 2, the agricultural tractor has a cab 1 formed of vertical frames 2 of a structural framework B constituting a framework, boarding and alighting side doors 3, rear side windows 4 and a rear window 5 having transparent glass planes covering portions surrounded by the vertical frames 2, an annular upper frame 6 extending over upper surfaces of the vertical frames 2, and a roof 7 placed on the upper frame 6.

The cabin 1 defines a driving and control section 8 therein. The driving and control section 8 includes a steering wheel 11 attached to a steering column 10 disposed adjacent an engine hood 9, and a driver's seat 12 disposed rearwardly of the steering column 10. The rearward end of the seating portion of the driver's seat 12 means a rear end of the top surface where the driver sits. When the seat 12 has a seat pad portion and a separate seat back, the rearward end of the seating portion of the driver's seat 12 may mean the rearward end of the seat pad portion.

The roof 7 supports an air-conditioning unit A for air-conditioning the interior of the cab 1.

First Embodiment

Figure 3:
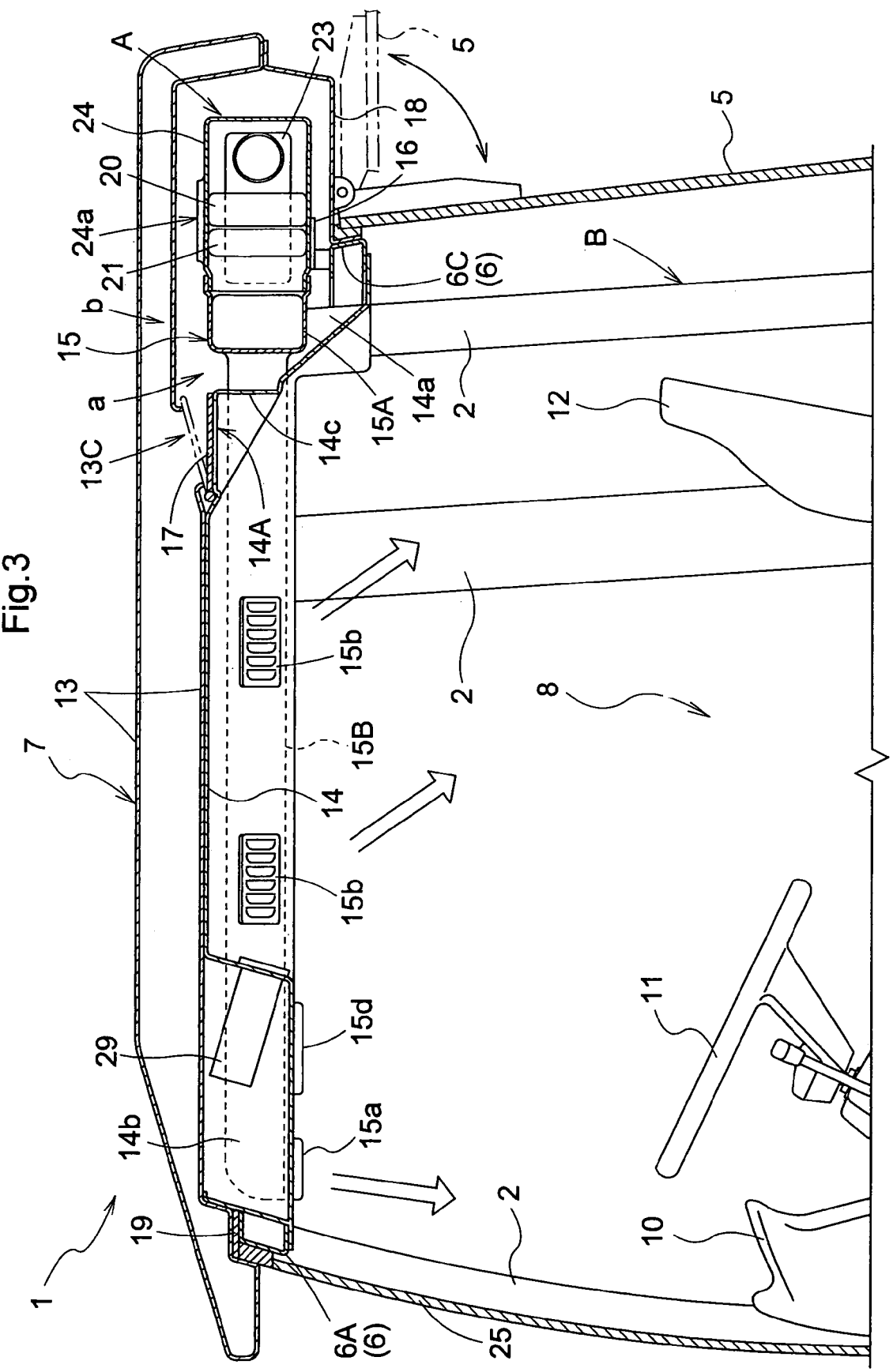
FIG. 3 shows a side view in vertical section showing a cabin interior in the first embodiment.

Different forms of attaching the air-conditioning unit A will be described hereinafter. A first embodiment will be described first, in which, as shown in FIGS. 2 and 3, the air-conditioning unit A is mounted above a rear end of the annular upper frame 6 extending over the upper surfaces of the vertical frames 2 constituting the structural framework B.

A rear frame portion 6B located in a rear position of a hood portion 7 of the annular upper frame 6 is called a transverse frame herein.

The construction of the structural framework B for supporting the air-conditioning unit A will be described. As shown in FIG. 2, right and left vertical frames 2 are erected at connecting bend portions between fore and aft frame portions 6A and rear frame portion 6B acting as the transverse frame of the annular upper frame 6, to serve also as window frames of the rear side windows 4. A support frame 6C is laid to extend between the two vertical frames 2 and at a height level a step lower than the rear frame portion 6B.

The air-conditioning unit A is placed in a state of being dropped on the upper surface of the support frame 6C and between the neighboring vertical frames 2 supporting the support frame 6C. The support frame 6C is called herein an air-conditioning unit mounting portion.

As shown in FIG. 3, a pair of right and left brackets 16 are attached in a fore and aft posture to the upper surface of the support frame 6C. The air-conditioning unit A enclosed in a unit case 24 is placed on and fixed by bolts to the right and left brackets 16.

The construction of the roof 7 will be described.

Figure 4:
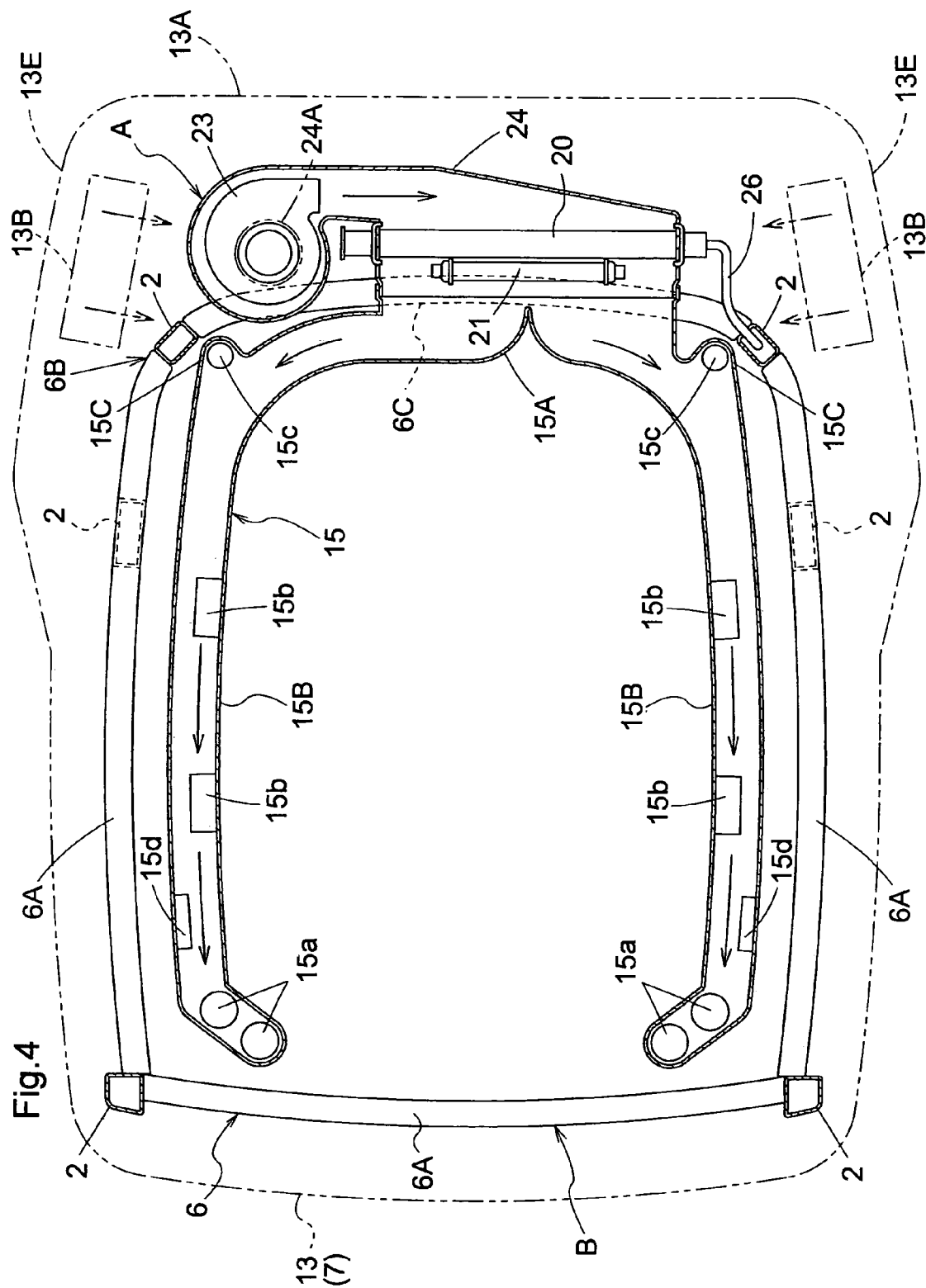
FIG. 4 shows a plan view in cross section showing an inner surface of an inner roof portion seen from an outer roof in FIG. 2.
Figure 5:
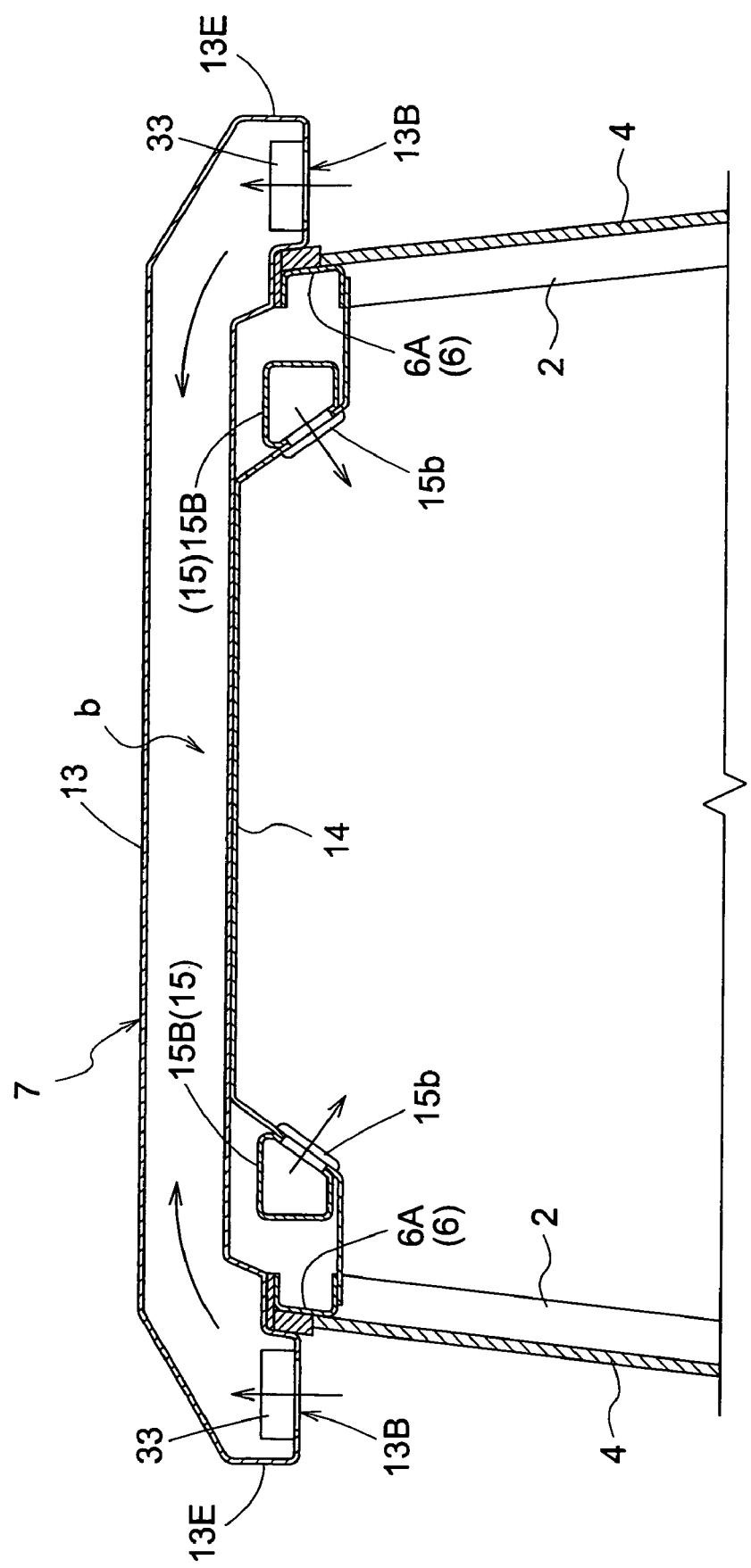
FIG. 5 shows a front view showing a duct disposed laterally of a roof.

As shown in FIGS. 3 through 5, the roof 7. includes an outer roof 13 and an inner roof 14, each attached to and supported by the upper frame 6. The inner roof 14 is an integral resin molding article, has a rearward half thereof above the driver's seat 12 formed as a low ceiling portion bulging downward. The air-conditioning unit A is mounted in this low ceiling portion.

As shown in FIGS. 2 and 3, the outer roof 13 is laid on the upper surface of the upper frame 6, and is in the form of a flat plate larger than the support surface. A seal ring 19 of rectangular section formed in the shape of a ring is attached to a downward-facing surface of the outer roof 13. In the state of the outer roof 13 laid on the upper frame 6, part of the section of the seal ring 19 contacts the upper surface of the upper frame 6, to stop circulation of air to and from the exterior.

As shown in FIGS. 3 through 5, ambient air intake openings 13B are formed in downward surfaces of sideways eaves portions 13E of the outer roof 13 projecting from opposite sides of the upper frame 6. An ambient air feed opening 13C communicating with the above ambient air intake openings 13B is formed in a position inwardly of the seal ring 19. Numeral 33 in the drawings denotes dust filters provided for the ambient air intake openings 13B.

Air drawn in through the ambient air intake openings 13B is guided forwardly of the vehicle body through a communicating path "b" acting as an ambient air feed duct formed in the double wall of the outer roof 13, and is blown off from the ambient air feed opening 13C formed forwardly of the communicating path "b" into a space "a" leading to the air-conditioning unit A described hereinafter.

The internal structure of the inner roof 14 will be described. As shown in FIGS. 1 through 4, the air-conditioning unit A includes an evaporator 20, and a heater 21 disposed forwardly thereof The evaporator 20 cooperates with a compressor, an expansion valve and a condenser to constitute a coolant circulation circuit. The heater 21 is connected through piping to a radiator 22 mounted in the engine hood 9.

A sirocco fan 23 is disposed at the right-hand side of the evaporator 20 for feeding the ambient air drawn in through the ambient air feed opening 13C toward the evaporator 20 and heater 21.

As shown in FIG. 3, the ambient air introduced through the ambient air feed opening 13C, is drawn and guided through the space "a" formed between the downward surface of the outer roof 13 and the inner roof 14 acting as a circulation path, to a guide bore 24a of the sirocco fan 23 enclosed in the unit case 24.

As shown in FIGS. 3 and 4, the evaporator 20 and sirocco fan 23 are surrounded by the unit case 24. A rear air-conditioning duct 15A continuous with the unit case 24 extends transversely for guiding conditioning air from the air-conditioning unit A, from opposite lateral ends of the evaporator 20 to the right and left sides. Lateral air-conditioning ducts 15B extend forward from opposite lateral ends of the rear air-conditioning duct 15A for guiding the conditioning air forwardly of the vehicle body.

The right and left air-conditioning ducts 15B and 15B will be described. As shown in FIGS. 3 through 5, each of the right and left air-conditioning ducts 15B has inwardly directed blow-off openings 15b, and the rearward blow-off opening 15b is located for directing an appropriate amount of cool air near the driver's face. On the other hand, each lateral air-conditioning duct 15B has blow-off openings 15a arranged adjacent the forward thereof and directed forward and downward for blowing off the conditioning air toward a windshield 25 of the cab 1, and a blow-off opening 15d disposed rearwardly of the blow-off openings 15a for blowing off defrost air toward the door glass.

As shown in FIGS. 2 and 3, branch ducts 15C extend rearward from the opposite ends of the rear air-conditioning duct 15A, and blow-off openings 15c are formed at extension ends thereof for blowing off the conditioning air to the rear side windows 4 and rear window 5. The above lateral air-conditioning ducts 15B and the like are located in the inner roof 14, and are mounted in low ceiling portions formed at opposite sides of the inner roof 14 as shown in FIG. 5.

As shown in FIG. 3, the inner roof 14 includes a circulation opening 14A disposed forwardly of the portion accommodating the air-conditioning unit A for drawing in air of the cab interior. A wall surface extends upward along the unit case 24 from an upper surface of a slope of a bottom inner roof 14b defining the low ceiling portion, and the circulation opening 14A is formed in a horizontal portion at the upper end of the vertical surface 14c. The vertical surface 14c of the top inner roof 14a is called herein an interior air introducing duct.

On the other hand, the ambient air feed opening 13C and circulation opening 14A are vertically opposed to each other, and a switching valve 17 is disposed therebetween to act as a valve mechanism for opening and closing the ambient air feed opening 13C and circulation opening 14A. Thus, a switching is made between a state of drawing ambient air through the ambient air intake openings 13B into the space "a" formed between the inner roof 14 and outer roof 13, and a state of shutting off ambient air and circulating the air in the cab interior through the space "a".

The valve mechanism may be the slide type rather than the pivoting type. Although not shown, the valve mechanism is operable by a switching lever erected to a level above and adjacent the driver's seat 12.

As shown in FIG. 3, the inner roof 14, which has the circulation opening 14A for drawing in air of the cab interior, includes a rear top inner roof portion 14a defining the circulation opening 14A, and a forward inner roof portion 14b located in the forward part of the cab 1. The inner roof 14 has a fore and aft intermediate position thereof in tight contact with the outer roof 13. The intermediate position in tight contact separates the rear inner roof portion 14a and forward inner roof portion 14b. A CD radio cassette recorder 29 or the like is mounted in a space of the forward inner roof portion 14b having the above construction. The back pressure of the interior air taken in from the circulation opening 14A does not directly act on the CD radio cassette recorder 29 or the like, so that the CD radio cassette recorder 29 or the like has a reduced chance of drawing in dust and the like.

As shown in FIGS. 3 through 5, the ambient air intake openings 13B are arranged adjacent the air conditioning unit A. Consequently, the communicating path b formed in the outer roof portion 13 and communicating with the ambient air intake openings 13B may be shortened, and the sirocco fan 23 may have a reduced suction resistance.

A support cover 18 extends rearwardly of the support frame 6C for covering the air conditioning unit A. The rear window 5 is supported by the support frame 6C and on the undersurface of the support cover 18 to be pivotable rearward about a transverse axis X. In a closed state, the rear window 5 does not protrude a large extent rearward, thereby to avoid interference with a linkage mechanism and the like supporting a tilling implement, though these components are not shown in the drawings.

Second Embodiment

Figure 6:
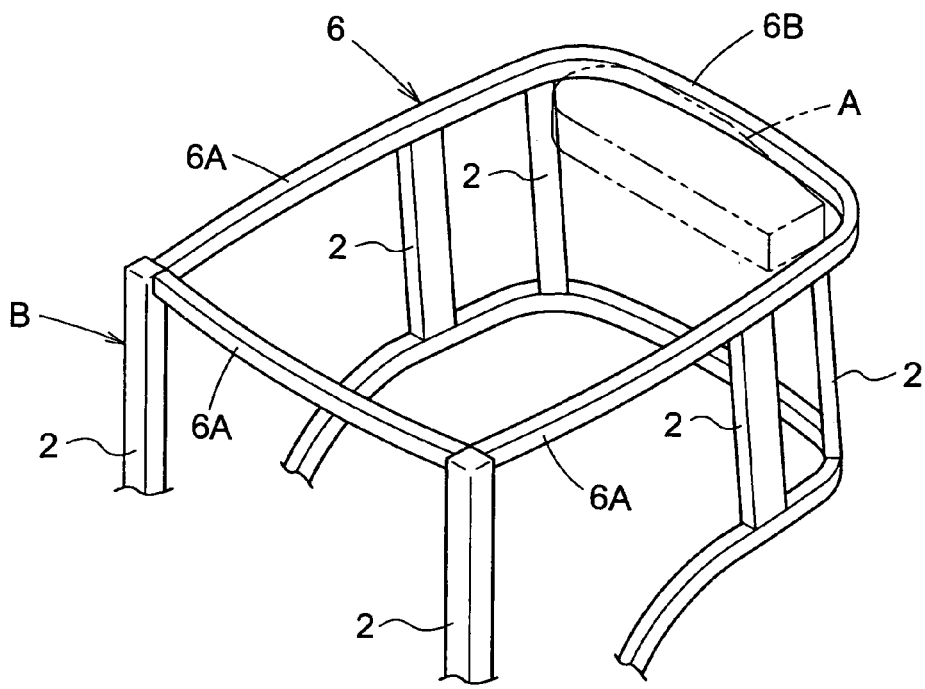
FIG. 6 shows a perspective view showing a structural frame in a second embodiment.

Next, a second embodiment will be described, in which, as shown in FIG. 6, the air-conditioning unit A is mounted forwardly of the rear end of the annular upper frame 6.

Figure 7:
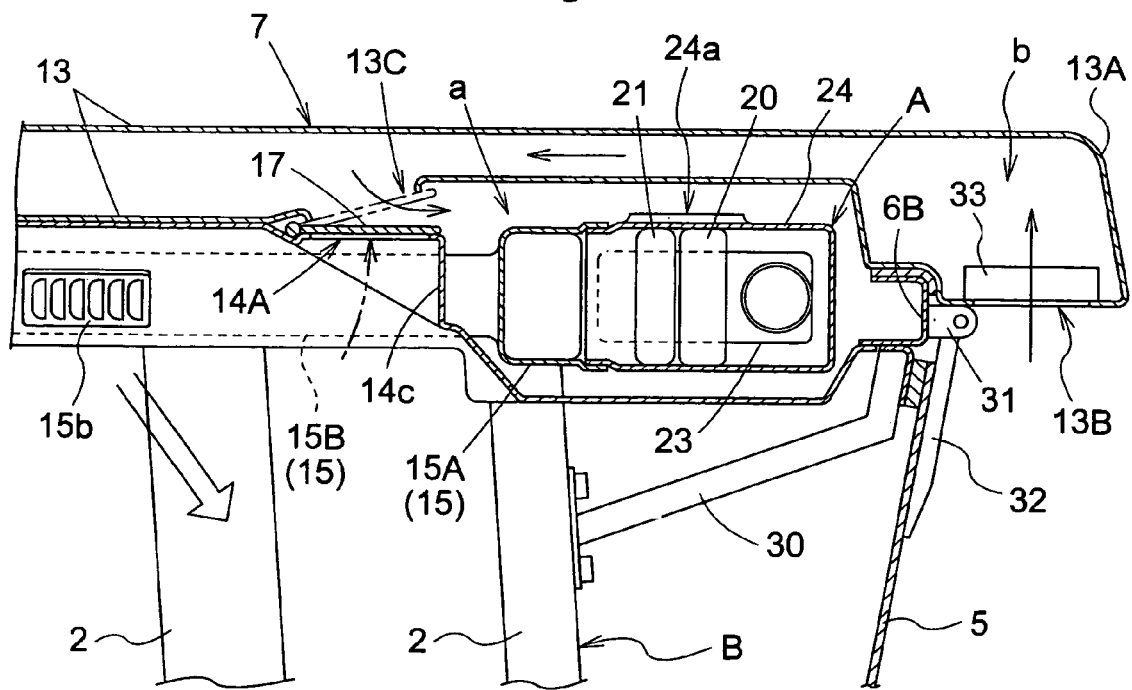
FIG. 7 shows a side view in vertical section side showing a mounting structure for an air conditioning unit in the second embodiment.

As shown in FIGS. 6 and 7, an outer roof 13 and an inner roof 14 are arranged to surround the air-conditioning unit A. An ambient air feed opening 13C is formed in the outer roof 13 forwardly of the air-conditioning unit A, and an ambient air intake opening 13B is formed in a downward surface of an eaves portion 13A of the outer roof 13 projecting rearwardly for feeding ambient air to the ambient air feed opening 13C. The inner roof 14 has a circulation opening 14A opposed to the ambient air feed opening 13C for drawing in air from the interior of the cab 1. A switching valve 17 is disposed between the ambient air feed opening 13C and circulation opening 14A to act as a valve mechanism for opening and closing the ambient air feed opening 13C and circulation opening 14A. A switching may be made between a state of drawing ambient air through the ambient air intake opening 13B into a space "a" formed between the inner roof 14 and outer roof 13, and a state of shutting off ambient air and circulating the air in the cab interior through the space "a".

Air taken into the space "a" is drawn into the sirocco fan 23 via a guide bore 24a formed in the upper surface of the unit case 24 of the air-conditioning unit A. After being conditioned by the evaporator 20 and the like, the air is delivered to the air-conditioning ducts 15A and 15B.

As shown in FIG. 4, the rear air-conditioning duct 15A extends from opposite lateral ends of the evaporator 20 as described hereinbefore, and lateral air-conditioning ducts 15B extend forward from opposite lateral ends of the rear air-conditioning duct 15A for blowing off conditioning air into the cab as in the first embodiment.

Next, a mounting structure for the rear side windows 4 and rear window 5 will be described. FIG. 7 shows the air-conditioning unit A disposed forwardly of the rear end of the annular upper frame 6. In order to employ the construction for arranging the air-conditioning unit A forwardly of the rear end of the annular upper frame 6, the rear end of the annular upper frame 6 is displaced rearwardly of the position of the rear window 5. For this reason, rear pillars acting as the vertical frames 2 located at boundaries between the rear window 5 and rear side windows 4 are connected to the upper frame 6 through connecting frames 30 to increase connecting strength of the frames. The rear window 5 is supported, to be pivotable rearward to an open position, by pivot arms 32 pivotally connected to brackets 31 attached to the rear frame portion 6B of the upper frame 6.

Third Embodiment

Figure 8:
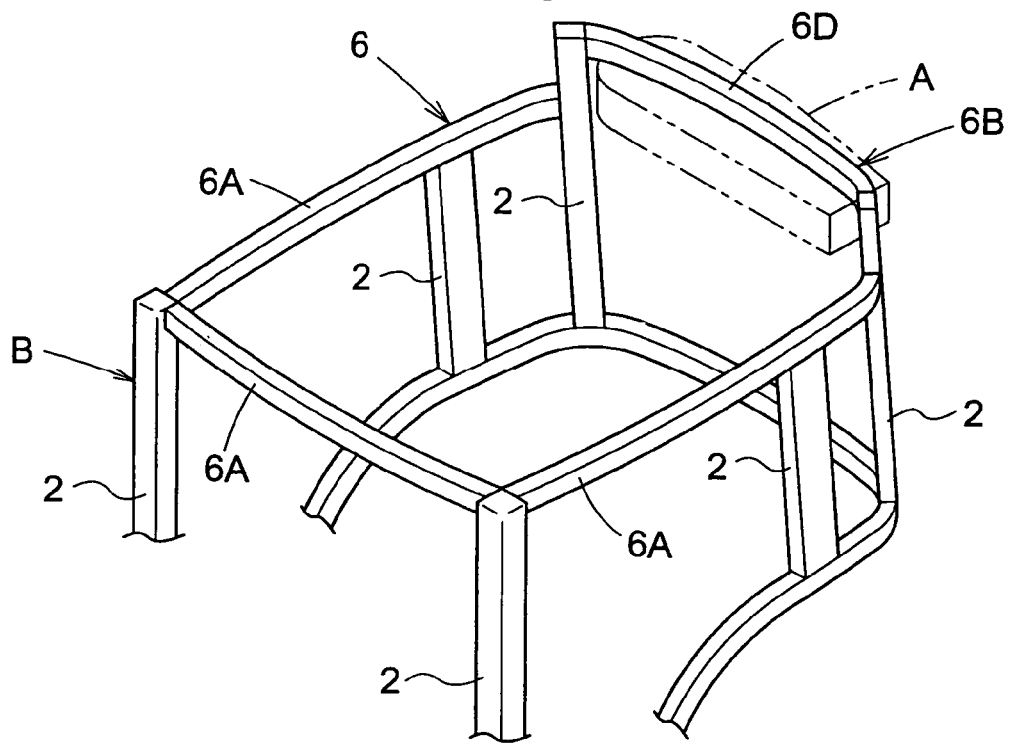
FIG. 8 shows a perspective view showing a structural framework in a third embodiment.

Next, a third embodiment will be described, in which, as shown in FIG. 8, the air-conditioning unit A is mounted below a suspending frame portion 6D formed on the rear frame portion 6B acting as the transverse frame.

Figure 9:
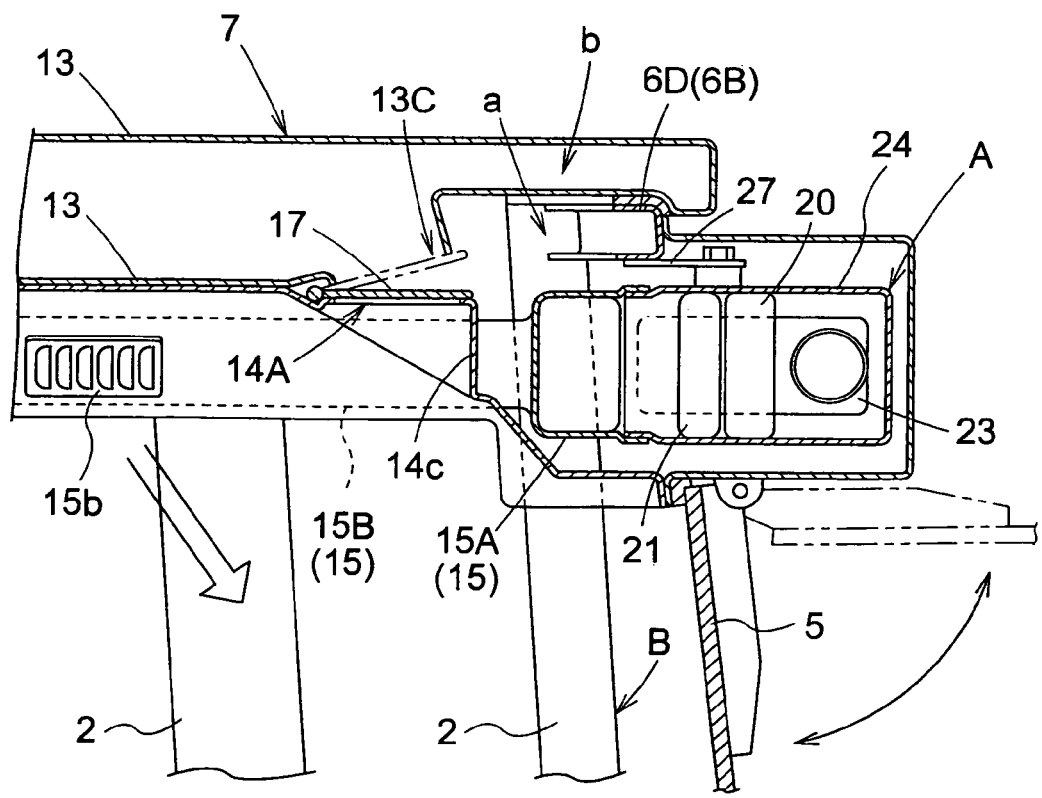
FIG. 9 shows a side view in vertical section side showing a mounting structure for an air conditioning unit in the third embodiment.

The construction of the structural framework B for supporting the air-conditioning unit A will be described. As shown in FIGS. 8 and 9, right and left vertical frames 2 are erected at connecting bend portions between fore and aft frame portions 6A and rear frame portion 6B of the annular upper frame 6, to serve also as window frames of the rear side windows 4. The suspending frame portion 6D is laid to extend between the two vertical frames 2 and at a height level a step higher than the rear frame portion 6B.

The air-conditioning unit A is suspended in a state of being slipped under the lower surface of the suspending frame portion 6D and between the neighboring vertical frames 2 supporting the suspending frame portion 6D. The suspending frame portion 6D is called herein an air-conditioning unit mounting portion.

As shown in FIG. 9, a pair of right and left brackets 27 are attached in a fore and aft posture to the lower surface of the suspending frame portion 6D. The air-conditioning unit A enclosed in a unit case 24 is fixed by bolts to the right and left brackets 27.

As shown in FIG. 9, an outer roof 13 and an inner roof 14 are arranged to surround the air-conditioning unit A. An ambient air feed opening 13C is formed in the outer roof 13 forwardly of the air-conditioning unit A, and ambient air intake openings (not shown) are formed in eaves portions (not shown) of the outer roof 13 projecting laterally of the vehicle body for feeding ambient air to the ambient air feed opening 13C. The inner roof 14 has a circulation opening 14A opposed to the ambient air feed opening 13C for drawing in air from the interior of the cab 1. A switching valve 17 is disposed between the ambient air feed opening 13C and circulation opening 14A to act as a valve mechanism for opening and closing the ambient air feed opening 13C and circulation opening 14A. A switching may be made between a state of drawing ambient air through the ambient air intake opening 13B into a space "a" formed between the inner roof 14 and outer roof 13, and a state of shutting off ambient air and circulating the air in the cab interior through the space "a".

Air taken into the space "a" is drawn into the sirocco fan 23 via a guide bore (not shown) formed in the upper surface of the unit case 24 of the air-conditioning unit A. After being conditioned by the evaporator 20 and the like, the air is delivered to the air-conditioning ducts 15A and 15B.

As shown in FIG. 4, the rear air-conditioning duct 15A extends from opposite lateral ends of the evaporator 20 as described hereinbefore, and lateral air-conditioning ducts 15B extend forward from opposite lateral ends of the rear air-conditioning duct 15A for blowing off conditioning air into the cab as in the second embodiment.

As shown in FIG. 9, the rear window 5 is supported by the undersurface of a portion of the inner roof 14 projecting rearwardly of the vertical frames 2. The rear window 5 does not protrude a large extent rearward, thereby to avoid interference with a linkage mechanism and the like supporting a tilling implement, though these components are not shown in the drawings.

Fourth Embodiment

Figure 10:
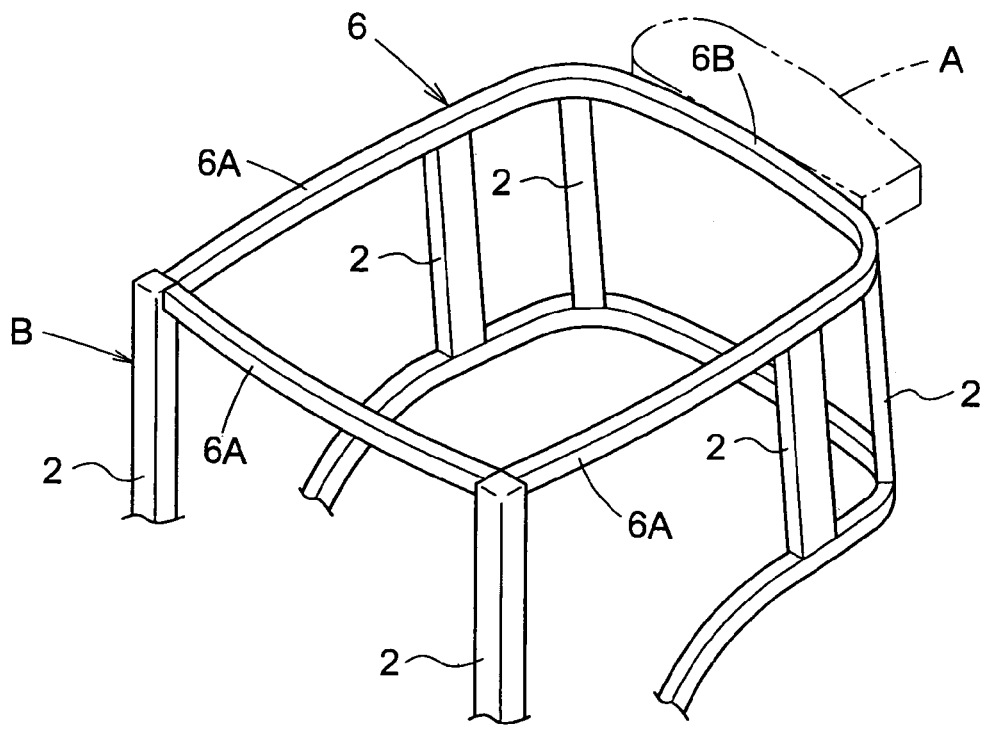
FIG. 10 shows a perspective view showing a structural framework in a fourth embodiment.

Next, a fourth embodiment will be described, in which, as shown in FIG. 10, the air-conditioning unit A is mounted further rearwardly of the rear frame portion 6B acting as the transverse frame.

Figure 11:
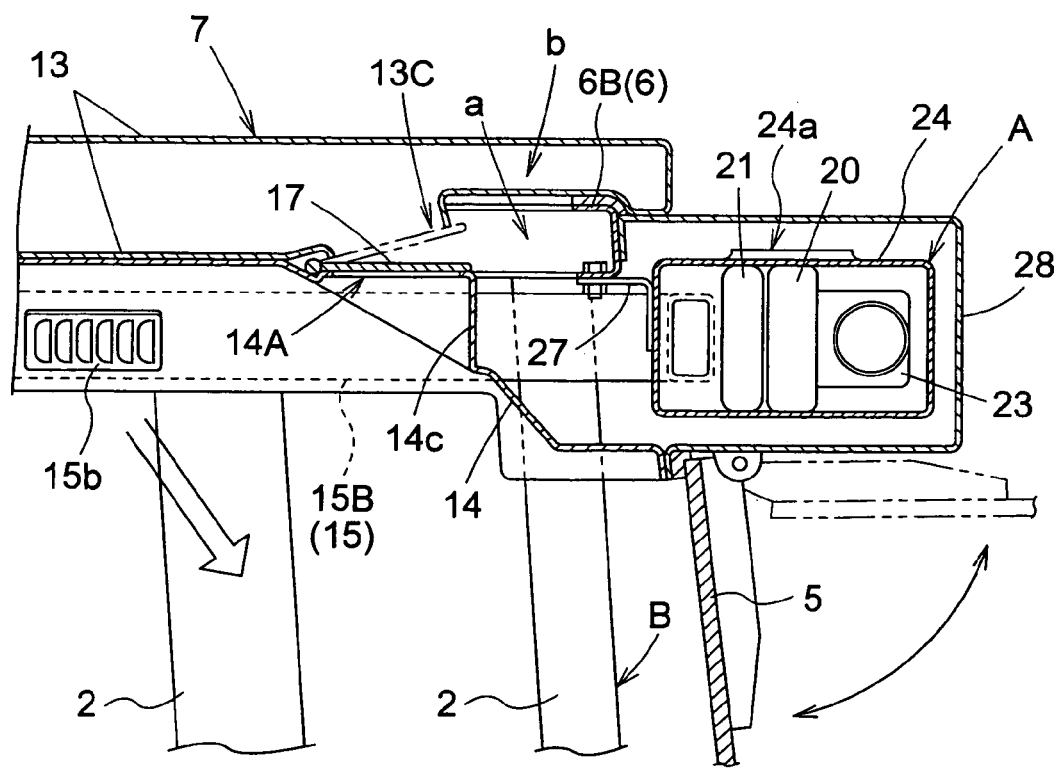
FIG. 11 shows a side view in vertical section side showing a mounting structure for an air conditioning unit in the fourth embodiment.

The construction of the structural framework B for supporting the air-conditioning unit A will be described. As shown in FIGS. 10 and 11, right and left vertical frames 2 are erected at connecting bend portions between fore and aft frame portions 6A and rear frame portion 6B of the annular upper frame 6, to serve also as window frames of the rear side windows 4.

As shown in FIG. 11, a pair of right and left brackets 27 are attached in a fore and aft posture to the lower surface of the rear frame portion 6B. The air-conditioning unit A enclosed in the unit case 24 is fixed by bolts to the right and left brackets 27.

As shown in FIG. 11, a rear cover 28 is attached to the rear frame portion 6B to surround the air-conditioning unit A attached to the rear frame portion 6B. The outer roof 13 is supported by the rear frame portion 6B, and the inner roof 14 is supported by the rear cover 28.

An ambient air feed opening 13C is formed in the outer roof 13, and ambient air intake openings (not shown) are formed in eaves portions (not shown) of the outer roof 13 projecting laterally of the vehicle body for feeding ambient air to the ambient air feed opening 13C. The inner roof 14 has a circulation opening 14A opposed to the ambient air feed opening 13C for drawing in air from the interior of the cab 1. A switching valve 17 is disposed between the ambient air feed opening 13C and circulation opening 14A to act as a valve mechanism for opening and closing the ambient air feed opening 13C and circulation opening 14A. The switching valve 17 switches between a state of drawing ambient air introduced through the ambient air intake opening 13B, via a space between the inner roof 14 and outer roof 28, into an inner space "a" of the rear cover 28, and a state of shutting off ambient air and circulating the air in the cab interior through the inner space "a". Reference "b" in the drawing denotes an ambient intake guide, and 14c denotes an interior air intake guide.

Air taken into the space "a" is drawn into the sirocco fan 23 via a guide bore 24a formed in the upper surface of the unit case 24 of the air-conditioning unit A. After being conditioned by the evaporator 20 and the like, the air is delivered to the air-conditioning ducts 15A and 15B.

As shown in FIG. 4, the rear air-conditioning duct 15A is disposed forwardly of the evaporator 20, and lateral air-conditioning ducts 15B extend forward from opposite lateral ends of the rear air-conditioning duct 15A for blowing off conditioning air into the cab as in the first to third embodiments.

The rear window 5 is supported by an undersurface of a connection between the inner roof 14 and rear cover 28. The rear window 5 does not protrude a large extent rearward, thereby to avoid interference with a linkage mechanism and the like supporting a tilling implement, though these components are not shown in the drawings.

Other Embodiments

The following modified constructions should be understood as applicable to the first to fourth embodiments described hereinbefore.

Figure 12:
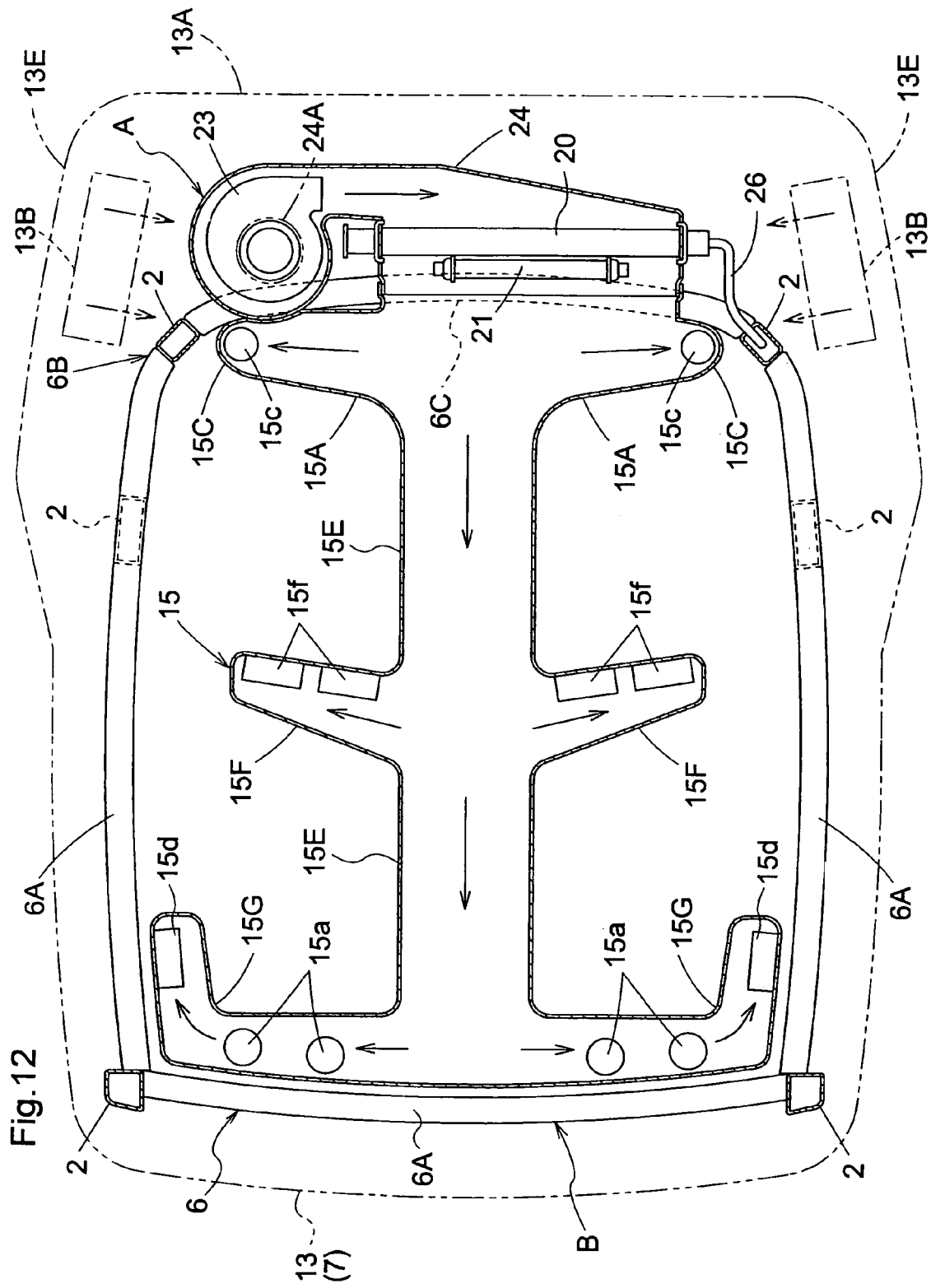
FIG. 12 shows a plan view in cross section showing a different embodiment of the air conditioning duct.

(1) A modified construction of the air-conditioning duct 15 will be described. A construction in which ducts 15 are arranged in the cab 1 and in a transversely middle position of the roof 7 will be described here. As shown in FIG. 12, an evaporator 20 and a sirocco fan 23 are surrounded by a unit case 24. A rear air-conditioning duct 15A continuous with the unit case 24 extends transversely for guiding conditioned air from the air-conditioning unit A, from opposite lateral ends of the evaporator 20 to the right and left sides. A central air-conditioning duct 15E acting as a main air-conditioning duct extends forward from a transversely middle portion of the rear air-conditioning duct 15A for guiding the conditioned air forwardly of the vehicle body.

As shown in FIG. 12, the central air-conditioning duct 15E include right and left intermediate branch air-conditioning ducts 15F acting as branch air-conditioning ducts extending right and left from intermediate positions in the fore and aft direction, and front air-conditioning ducts 15G extending to full extents right and left, from positions forwardly of the intermediate branch air-conditioning ducts 15F. Each of the right and left intermediate branch air-conditioning ducts 15F has blow-off openings 15f formed therein. The blow-off openings 15f are located to blow off an appropriate quantity of cool air to near the driver's face. On the other hand, the front air-conditioning ducts 15G have front blow-off openings 15a formed therein for blowing off conditioning air forward and downward toward the windshield 25 of the cab 1, and blow-off openings 15d formed rearwardly of the front blow-off openings 15a for blowing off defrost air toward the door glass panes.

As shown in FIG. 12, branch ducts 15C extend rearward from opposite lateral ends of the rear air-conditioning duct 15A, and have blow-off openings 15c formed therein for blowing conditioning air to the rear side windows 4 and rear window 5.

Figure 13:
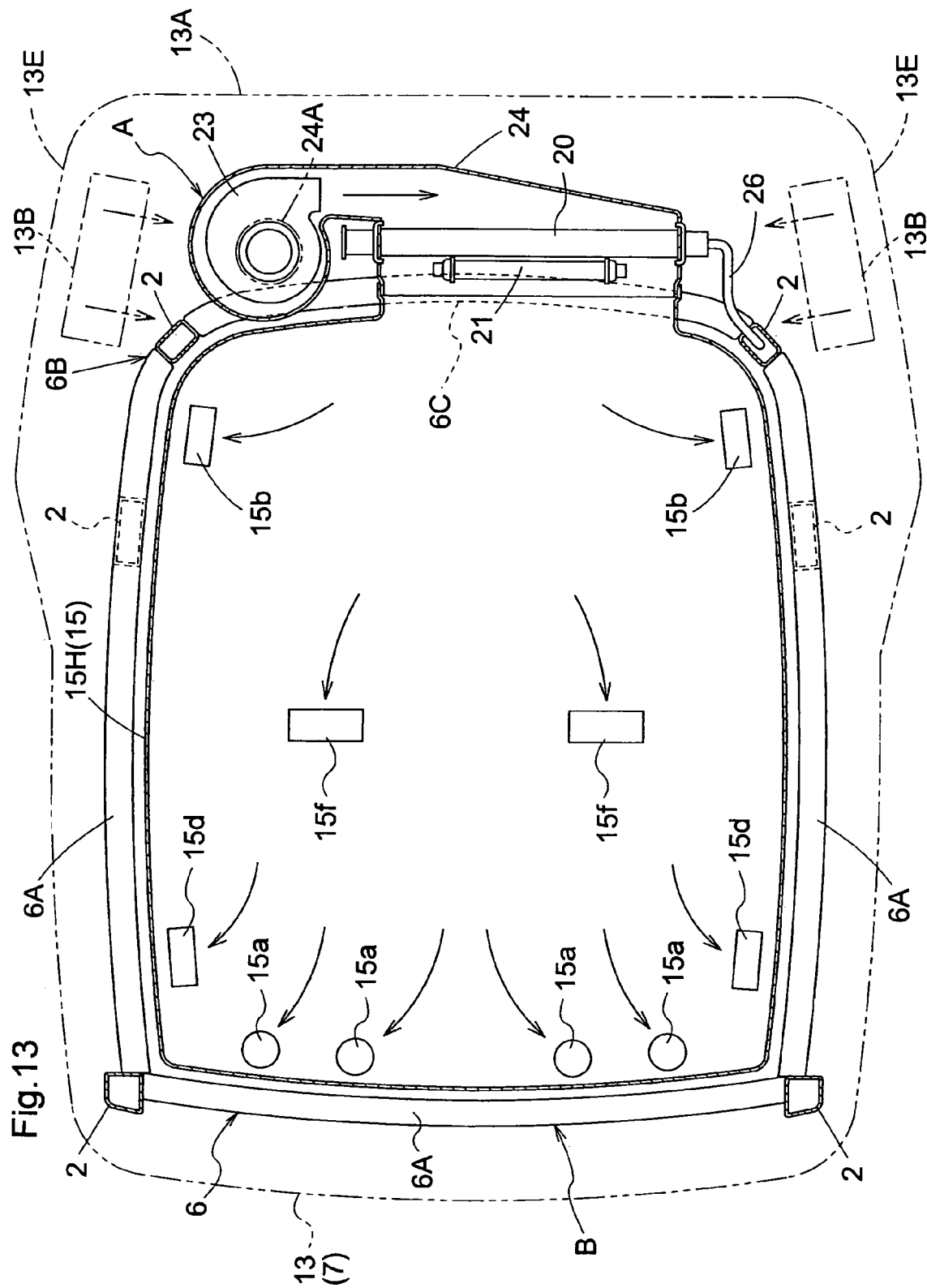
FIG. 13 shows a plan view in cross section showing a different embodiment of the air conditioning duct.
Figure 14:
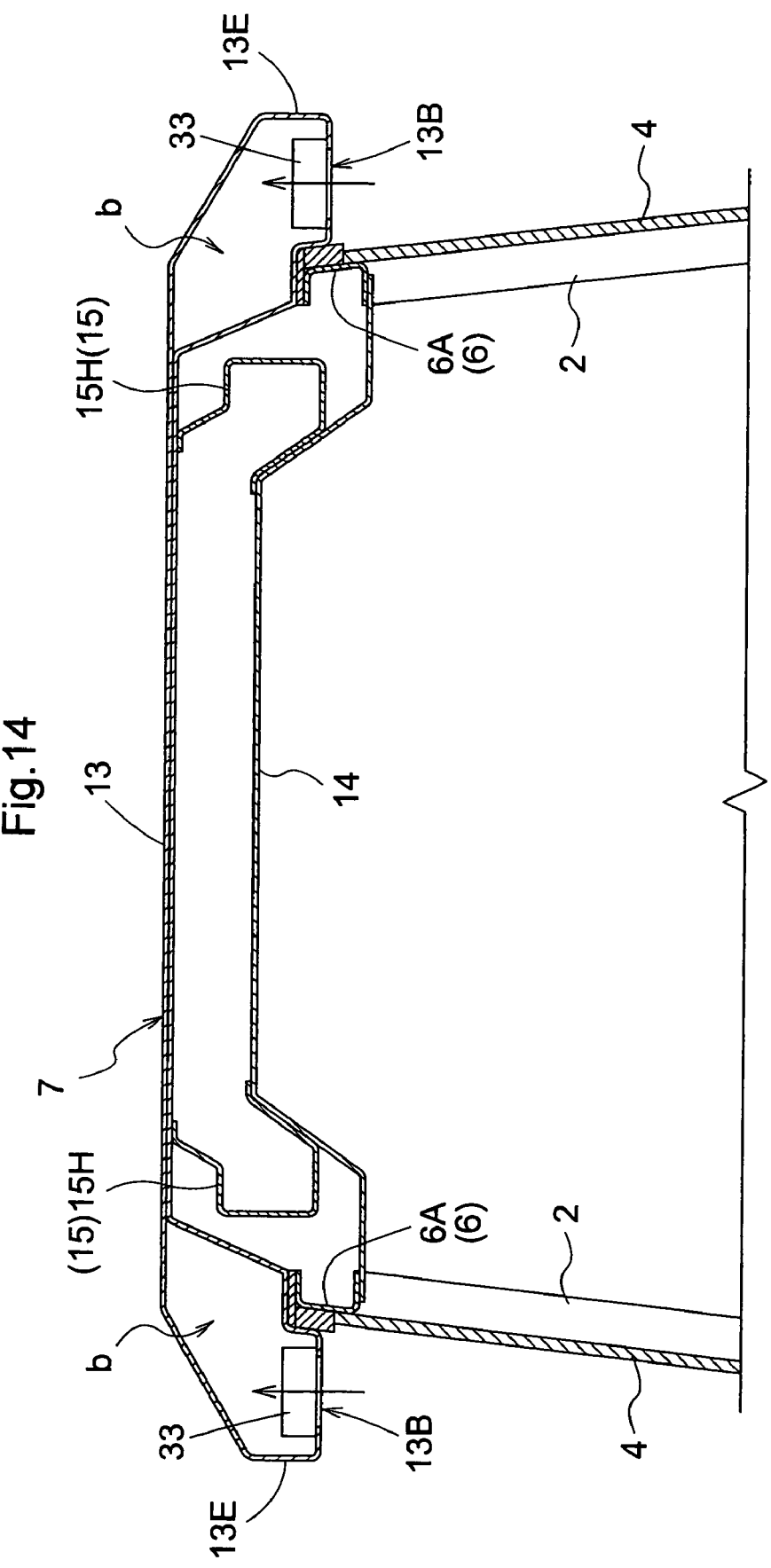
FIG. 14 shows a rear view showing an arrangement of the air conditioning duct in FIG. 13.

(2) A different modified construction of the air-conditioning duct 15 will be described. In this construction, the duct 15 is arranged in the cab 1 to cover the entire surface of the roof 7. As shown in FIGS. 13 and 14, an evaporator 20 and a sirocco fan 23 are surrounded by a unit case 24. A full surface air-conditioning duct 15H continuous with the unit case 24 extends forward from opposite lateral ends of the evaporator 20 for guiding conditioned air forward from the air-conditioning unit A.

As shown in FIG. 13, the full surface air-conditioning duct 15H has blow-off openings 15f formed in intermediate positions in the fore and aft direction. The blow-off openings 15f are located to blow off an appropriate quantity of cool air rearward to near the driver's face. On the other hand, blow-off openings 15a are formed in the cab 1 for blowing off conditioning air forward and downward toward the windshield 25 of the cab 1. Blow-off openings 15d are formed rearwardly of the front blow-off openings 15a for blowing off defrost air toward the door glass panes.

As shown in FIG. 13, the full surface air-conditioning duct 15H has blow-off openings 15b formed therein for blowing conditioning air to the rear side windows 4 and rear window 5. The air-conditioning duct 15 covering substantially the entire surface as described above has an advantage of allowing the blow-off openings to be formed in desired positions.

As a structure for introduces external air into the full surface duct 15H having such construction, as shown in FIGS. 13 and 14, ambient air feed openings 13B are formed in eaves portion 13E of the outer roof 13 projecting laterally of the vehicle body.

(3) Although not shown, bellows-like connectors may be provided in the connections between the right and left air-conditioning ducts 15B and 15B and rear air-conditioning duct 15A. Then, the connecting state is stabilized by the elasticity of the duct itself and by absorbing manufacturing errors, for example.

(4) As shown in FIG. 13, a hose 26 extends from the unit case 24 to discharge dew water from the evaporator 20. The hose 26 extends out of the vehicle body through the interior of the vertical frame 2 present adjacent the unit case 24.

Figure 15:
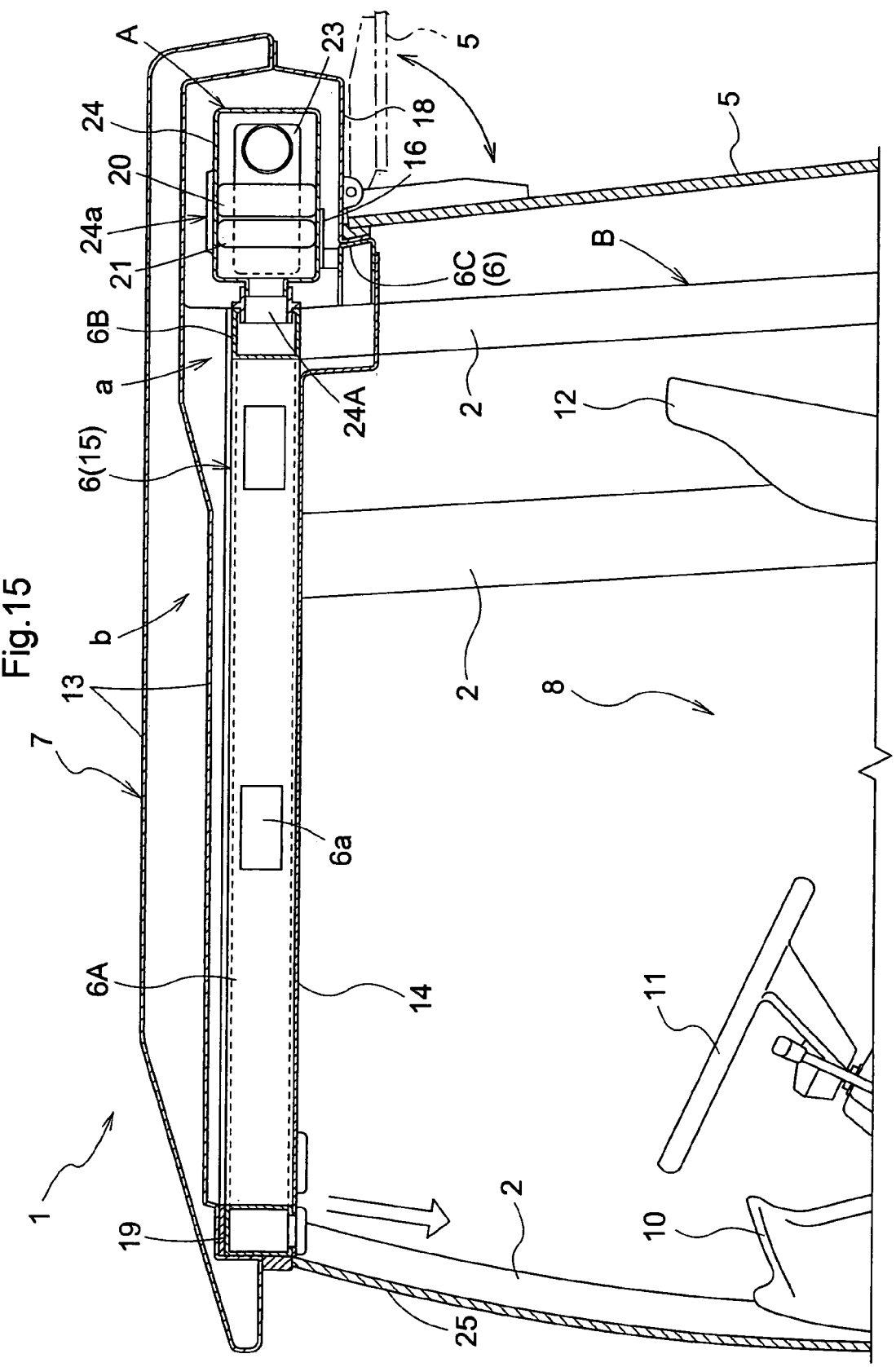
FIG. 15 shows Side view in vertical section side showing an upper frame serving also as a duct.

(5) A mode of using the upper frame 6 as air-conditioning ducts 15 will be described next. As shown in FIG. 15, an ambient air intake opening (not shown) is formed in a rearward eaves portion (not shown) of the outer roof 13. Air is taken in from a communicating path "b" of the outer roof 13 into a space "a" formed with the inner roof 14, and introduced through a guide bore 24a into the air-conditioning unit A. As shown in FIG. 15, ambient air and interior air introduced are sent out of an exit 24A of the unit case 24 after being adjusted by the air-conditioning unit A. The exit 24A communicates with the interior space of the upper frame 6, so that the fore and aft frame portions 6A of the upper frame 6 serve as the air-conditioning ducts 15.

Thus, as shown in FIG. 15, air blow-off openings 6a of conditioned air are formed in inner surfaces of the fore and aft frame portions 6A. Since the upper frame 6 is used also as air-conditioning ducts, there is no need to provide air-conditioning ducts separately.

The mode of supporting the air-conditioning unit A is the same as in the first embodiment.

Figure 16:
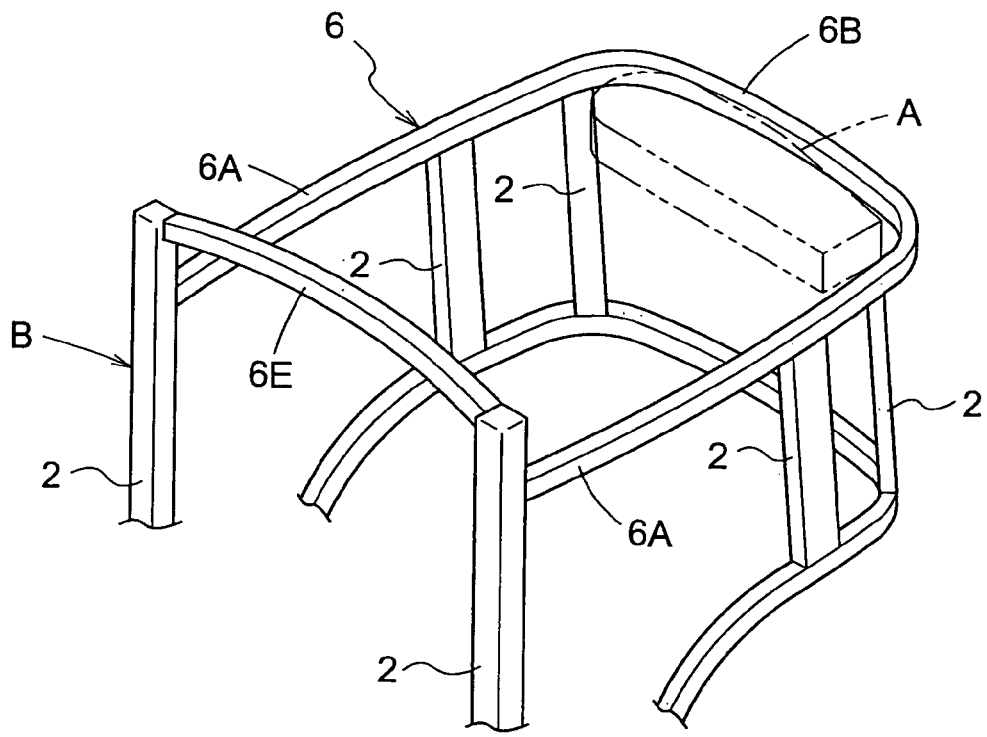
FIG. 16 (A) shows a perspective view showing upper ends of front posts higher than fore and aft frames.
Figure 16:
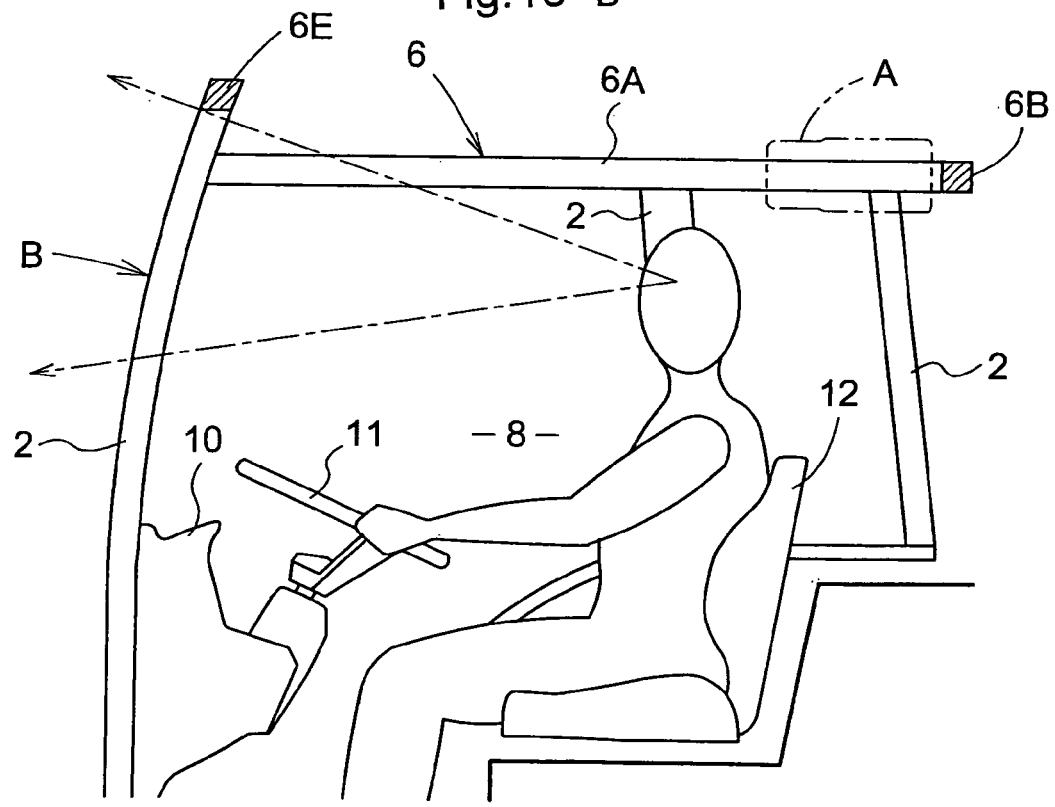

(6) The following framework construction may be adopted for the cab 1. As shown in FIG. 16 (A), (B), right and left front struts 2, supporting the windshield 25, of the structural framework B project above the right and left, fore and aft frame portions 6A of the upper frame 6, and an upper front frame portion 6E extending transversely and connecting upper ends of the front struts 2 is installed above the right and left, fore and aft frame portions 6A. Since these components are located above the right and left, fore and aft frame portions 6A, the windshield 25 may be located in a correspondingly elevated position, to provide an excellent, enlarged field of view for the driver.

Figure 17:
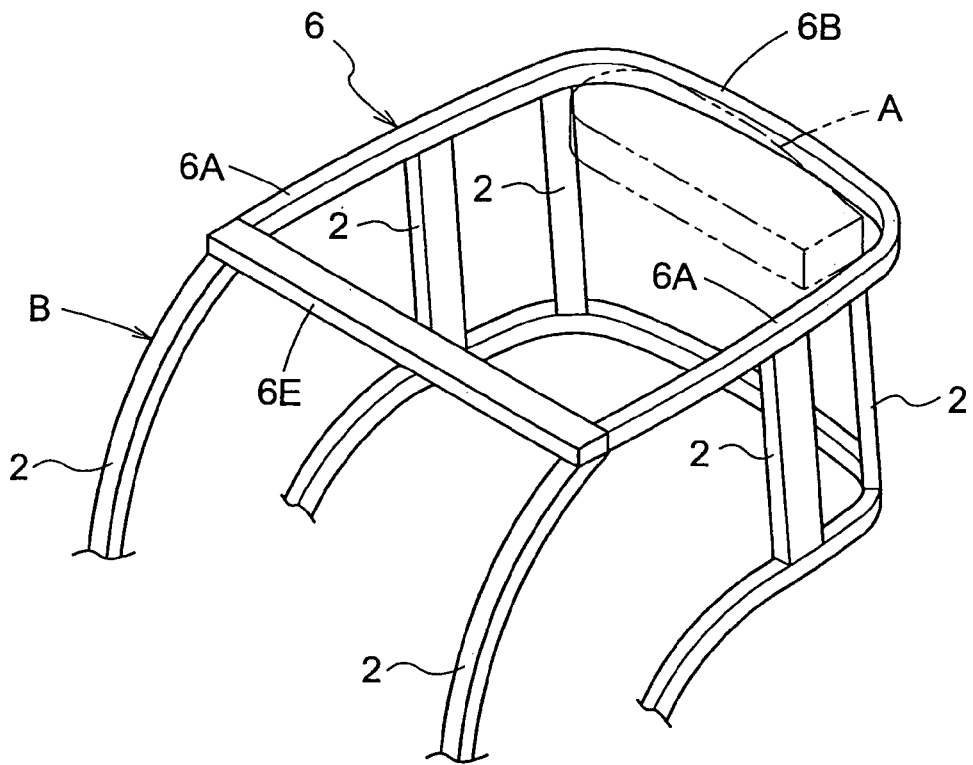
FIG. 17 (A) shows a perspective view showing upper ends of front posts arranged rearwardly of forward ends of fore and aft frames, and FIG. 17 (B) shows a principle view showing an upper forward field of view for the driver in FIG. 17 (A).
Figure 17:
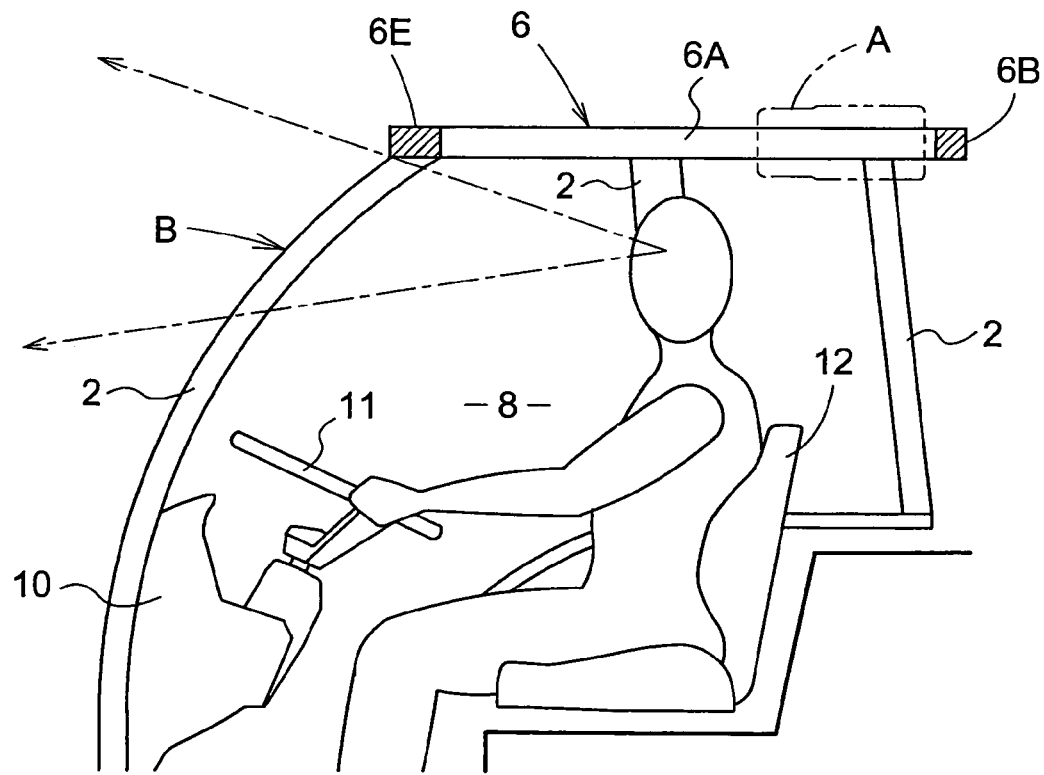

As shown in FIG. 17 (A), (B), right and left front struts 2 are curved so that upper end regions 2A are located further rearward than lower regions of the front struts 2. An upper front frame portion 6E is placed to extend between the upper ends of the front struts 2. The upper front frame portion 6E and the right and left, fore and aft frame portions 6A are set to the same height.

With this construction, the upper front frame portion 6E can be located further rearward than the lower regions of the front struts 2. The driver can look up with an enlarged field of view, to be able to see an increased height.

(7) The outer roof 13 may have eaves portions projecting laterally or fore and aft from the upper frame 6, to prevent direct rays entering the cab having large glass surfaces.

(8) The foregoing embodiments have been described as applying this invention to the agricultural tractor. The invention may be applied to other agricultural machines such as a combine or to construction equipment.

(9) A lateral air-conditioning duct 15B may be provided for only one of the right and left sides.

(10) The ambient air intake opening 13B may be provided only to one of the eaves portions 13E. Especially when it is provided on the left side (i.e. the side the operator often gets in and out of the cabin) of the roof (7), the filter in the ambient air intake opening 13B may more easily be accessed for checking and maintenance. Also, since the fan 23 is located on the right hand area of the roof 7, the air flow speed can be increased due to funneling effect since the opening 13B is located at a distance from the fan 23, leading to an increased efficiency of the fan 23.

What is claimed is:

1. An air conditioning system for a cabin of a work vehicle comprising: a roof (7) of the cabin (1); and an air conditioning unit (A) arranged in a rear portion of the roof (7), wherein
the roof (7) comprises a hollow outer roof (13) and an inner roof (14),
the inner roof (14) has a rearward portion thereof formed as a low ceiling portion bulging downward,
the outer roof (13) has a rearward portion thereof formed as an upward recess from a plane of joint with the inner roof (14), and
the air conditioning unit (A) is provided in a space formed between the low ceiling portion and the recess,
an air-conditioning duct (15) comprising right and left lateral air-conditioning ducts (15B, 15B) is located frontwardly with respect to the air conditioning unit (A) and in right and left lateral regions of the roof (7), which branches from the air conditioning unit (A) and extends to a front side of the roof (7),
the inner roof (14) has right and left lateral portions as downward bulging portions,
each of the right and left lateral air conditioning ducts (15B, 15B) is disposed in a space formed between the corresponding bulging portion of the inner roof (14) and a lower face of the outer roof (13),
the system further comprises an interior air intake duct (a) for guiding interior air from the interior of the cabin (1) to the air conditioning unit (A),
a circulation opening (14A) for drawing air inside the cabin (1) into the air condition unit (A) is formed in a rear portion of a ceiling recess between the right and left downward bulging portions of the inner roof (14), and an ambient air feed opening (13C) for drawing ambient air into the air condition unit (A) is formed in the lower face of the outer roof (13), the circulation opening (14A) and the ambient air feed opening (13C) being vertically opposed to each other, and
a switching valve (17) switchable between a state in which the circulation opening (14A) is opened and the ambient air feed opening (13C) is closed and a state in which the circulation opening (14A) is closed and the ambient air feed opening (13C) is opened is supported swingably about a laterally extending axis at a position frontward of the circulation opening (14A) and the ambient air feed opening (13C).

2. The air conditioning system according to claim 1, wherein
an ambient air intake opening (13B) for drawing ambient air thereinto to be conditioned by the air conditioning unit (A) is formed laterally of the air conditioning unit (A), and
the ambient air from the ambient air intake opening (13B) is provided to the ambient air feed opening (13C) through an inside of the outer roof (13).

* * * * *